United States Patent [19]

Lowell et al.

[11] 4,057,847
[45] Nov. 8, 1977

[54] REMOTE CONTROLLED TEST INTERFACE UNIT

[75] Inventors: William P. Lowell, Shoreview; Douglas M. Jagunich, New Brighton, both of Minn.

[73] Assignee: Sperry Rand Corporation, New York, N.Y.

[21] Appl. No.: 695,874

[22] Filed: June 14, 1976

[51] Int. Cl.² .................. G06F 3/00; G06F 11/04
[52] U.S. Cl. ............................. 364/200; 235/302
[58] Field of Search ............... 340/172.5, 146.1 R, 340/146.1 C; 445/1; 235/153 R, 153 AC; 364/200, 900; 324/73 R, 73 AT

[56] References Cited

U.S. PATENT DOCUMENTS

| | | | |
|---|---|---|---|
| 3,585,599 | 6/1971 | Hitt et al. | 340/172.5 |
| 3,733,587 | 5/1973 | Lloyd et al. | 340/172.5 |
| 3,764,995 | 10/1973 | Helf, Jr. et al. | 340/172.5 |
| 3,813,647 | 5/1974 | Loo | 340/172.5 |
| 3,825,901 | 7/1974 | Golnek, Sr. et al. | 340/172.5 |
| 3,831,149 | 8/1974 | Job | 340/172.5 |
| 3,854,125 | 12/1974 | Ehling et al. | 340/172.5 |

*Primary Examiner*—Melvin B. Chapnick

*Attorney, Agent, or Firm*—John B. Sowell; Kenneth T. Grace; Marshall M. Truex

[57] ABSTRACT

A universal remotely controlled test interface test unit is adapted to be connected through plug connections to an on-site computing system having one or more central processing units and associated peripheral equipment. The test interface unit is provided with a limited function keyboard control for initiating tests and a transceiver for communicating with a data processing unit at a remote location which supplies format and control signals for use by the test interface unit and data signals to be communicated to the on-site computing system. The data signals received by the test interface unit are first entered into a buffer register to provide parallel outputs. The format control signals activate logic gating signals to cause the data signals in the buffer register to be arranged in a control register in a format which is compatible with the equipment to be tested. The control register is arranged to operate any part of the central processing system under test and any of its intended modes of operation and to initiate readout of information from any part of the computing system through the transceiver for processing and examination by the remotely located data processing unit.

14 Claims, 7 Drawing Figures

REMOTE CONTROLLED TEST INTERFACE UNIT

BACKGROUND OF THE INVENTION

1. Field of the Invention

This invention relates to test equipment for computing systems and more particularly relates to an interface adapter unit which permits a remotely located data processing unit to be connected to an on-site computing system for purposes of maintenance or for remote control.

2. Description of the Prior Art

Most medium and large scale central processing units are equipped with maintenance panels to enable service personnel to make electrical and/or visual test of check points in the central processing system. As a general rule, the larger the central processing unit larger and more sophisticated the maintenance panels.

Some large scale central processing units are provided with maintenance controllers. Such maintenance controllers do not provide the same measure of control as the central control panel. Some maintenance controllers are provided with a plurality of selector switches which permit service personnel to manually set up conditions which simulate a software step input or a control step. In order that the information set in the manual switches of a maintenance controller be converted into instructions and data for use by the central processing system, the central processing unit must be in operable condition.

The Model 1929 Maintenance Controller, designed for use with the Model 1110 Central Processing Unit, made by Sperry Rand Corporation comprises an on-site processor which permits the controller to run a test program and to compare the test program results with correct test results accompanying the test program. The test program, even though limited to four functions, similar to the manually set switches in the maintenance panels, could run a test program separate and apart from the operation of the on-site central processing unit.

Heretofore, central processing systems have included a plurality of central processing units. The mode of operation of such systems is capable of connecting one central processing unit to another for the transfer of information therebetween.

Heretofore, central processing units in two different locations, remote from each other have been effectively connected to each other by employing interface adapters connected to telephone modems which are in turn connected by telephone lines. Such connections permit the transfer of information between computing systems.

During the manufacture of central processing units and/or peripheral equipment, simulators or processors are employed to electrically test the apparatus after it is assembled. After the processing units and peripheral equipment is shipped from the factory and assembled into a central processing system such simulated tests cannot be made.

Heretofore, maintenance panels have been limited to manually settable switches for simulating a limited amount of test information. Such maintenance panels could not operate the peripheral equipment without an operable central processing unit.

Heretofore, maintenance controllers have been limited to performing only a few selected functions of the many performable by a central processing unit. Such prior art maintenance controllers have not been provided with a direct interface connected to the central processing unit console or to the auxilliary consoles of the peripheral equipment, so that all equipment could be operated in a computer operated mode. When the on-site central processing unit malfunctions and/or the peripheral equipment malfunctions in a manner that requires high speed computer analysis, the prior art maintenance controllers and maintenance panels do not provide adequate means to diagnose and correct the problem.

It has been suggested that large central processing systems could be provided with a standby central processing unit which could be used for back-up and/or test purposes. Not only is this a very expensive luxury, but it presumes that each such installation is provided with a large library of special test programs.

Now that computers are being manufactured with solid state logic components and solid state memory components, there is an attempt to perform electronic switching functions faster and faster. The fastest components being employed today become metastable or unstable when switched too fast. It is possible for fast switching components to operate correctly for one program step or operation and to perform incorrectly when the identical step is presented in a different series of steps. Further, the step or malfunction may occur in the middle or near the end of a program comprising thousands of steps. A malfunction of this type is usually not detectable by making manual or slow step-by-step analysis. The only practical way to detect high speed errors is to operate the piece of equipment giving the problem at high speed and under the same conditions under which the error occurred. Heretofore, such diagnostic equipment was not available in a single unit of any type except at the factory where simulators and processors are employed to check out newly manufactured equipment.

There is an unfulfilled need for a reliable economical piece of equipment which can perform the functions of factory simulators and processors and could be transported to a central processing system site to perform diagnostic tests on the central processing unit as well as the peripheral equipment.

SUMMARY OF THE INVENTION

The present invention provides means for performing a broad range of factory simulated tests at a central processing system far removed from the factory and the simulators used for testing.

It is a primary object of the present invention to provide a novel test interface unit which is controllable by a computer and/or a visual display terminal located remotely from the test interface unit and associated central processing system.

It is another primary object of the present invention to provide a novel test interface unit which is capable of performing the functions and operations of a central processing system.

It is another primary object of the present invention to provide a novel test interface unit adapted to be connected to or substituted for any of the components of the central processing unit to which it is connected.

It is another primary object of the present invention to provide a novel test interface unit which receives signals from a remotely located central processing unit and converts the signals into a compatible interface format for use with a plurality of different central processing units and/or different peripheral equipments.

It is another object of the present invention to provide a novel portable test interface unit adapted to be connected to different components of a central processing system and which permits operation of the central processing system with or without the on-site central processing unit.

It is yet another object of the present invention to provide a novel interface unit capable of converting control and data signals received from a remotely located processing unit into different control and data signals which are capable of operating an automatic factory comprising a central processing system, a central processing unit and/or digital data controllable machine tools, process equipment and processes.

It is another object of the present invention to provide a novel interface unit capable of controlling and monitoring various types of central processing units, peripheral equipments, digital data controllable equipments in a step-by-step operational mode wherein the interface unit is further capable of enabling the analysis of the results of each step at very high speeds.

In accordance with these and other objects to be explained in greater detail hereinbefore there is provided a test interface unit adapted to be controlled either on-site or by remote control. When under remote control the transceiver communication means receives control signals and data signals from a remotely located data processing unit and formulates the received signals into a control array to be presented to the on-site central processing unit and/or peripheral devices to be tested. The test interface unit is further provided with means for reformulating signals produced by the on-site processing system under test and for transmitting said reformatted signals to a remotely located data processing unit where analysis and further simulation and tests are being generated, which permits on-site control.

DESCRIPTION OF THE PREFERRED EMBODIMENTS

Figure 1:
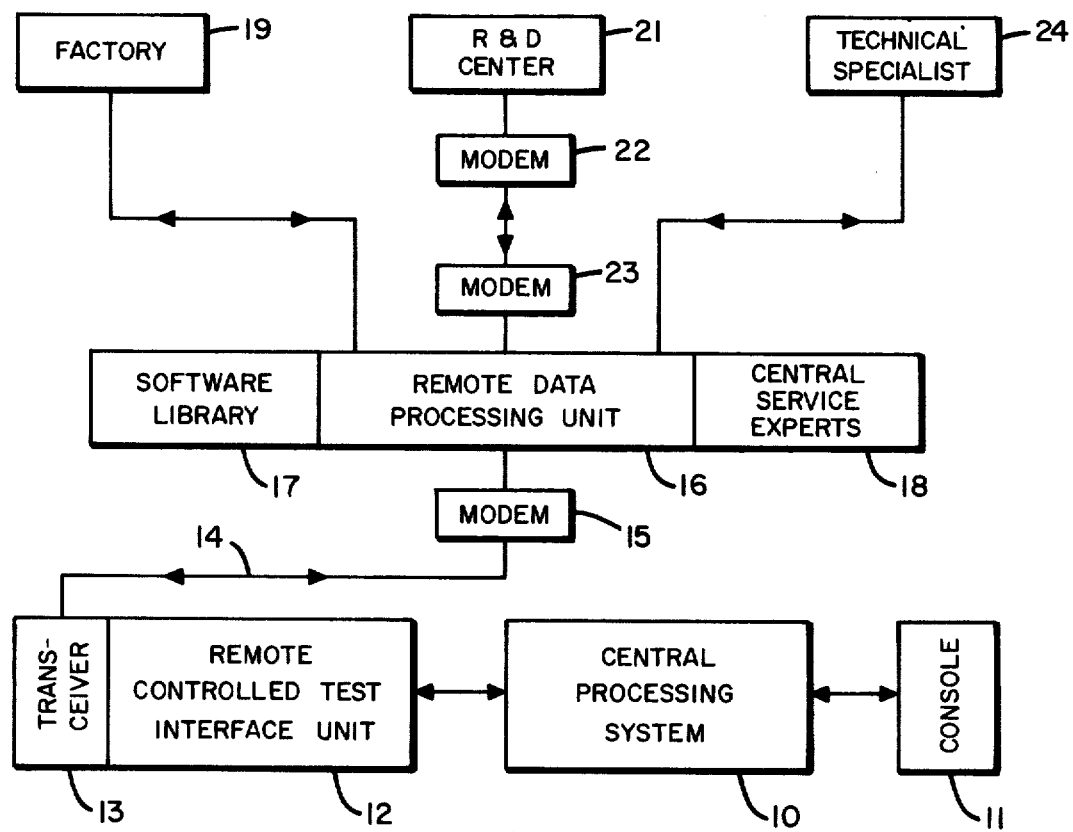
FIG. 1 is a block diagram showing a network of various test and service facilities which may be effectively connected to a central processing system through the present test interface unit.

The central processing system 10 shown in FIG. 1 is provided with a console 11 and a full complement of peripheral input-output (I/O) equipment. The I/O tape drives, and disk drives, having associated controllers, and the external memory systems usually associated with a central processing system, are not shown because they are not required to explain the operation of the remote controlled test interface unit (RCTIU) 12.

RCTIU 12 comprises a transceiver 13 connected by a phone line 14, or equivalent linkage, to a modem 15 located at the site of a remote data processing unit 16. The data processing unit 16 is preferably a large central processing system capable of communicating with numerous other central processing systems simultaneously. Data processing unit 16 comprises a very large library of software 17 including test and diagnostic programs for isolating and identifying malfunctions in the components comprising central processing system 10. In addition to the library 17, the processing unit has available substantial manpower comprising central service experts 18. The experts 18, their processing unit 16 and available library 17 comprise a diagnostic center capable of tracing any type of problem that may occur in the equipment comprising central processing system 10. It is recognized that experts other than central service experts 18 are often more capable of analyzing some problems that may occur in the field.

In the preferred embodiment shown in FIG. 1 a piece of diagnostic equipment (not shown) in factory 19 may be directly connected to processing unit 16. Further, factory 19 includes highly skilled manufacturing personnel having production drawings and equipment specifications which would enable them to answer questions concerning equipment comprising central processing system 10. Factory 19, may comprise a plurality of factories, each specializing in a single piece of equipment comprising system 10. Factories located at areas remote from processing unit 16 are preferably linked by modems. The information transferred between processing unit 16 and factory 19 is preferably converted into digital data form and transmitted under control of visual display terminals (not shown). The connection with the factory provides the expertise of the manufacturing personnel as well as the facilities employed to build and test equipment.

Research and development (R & D) center 21 is also connected to processing unit 16 through modems 22 and 23. It is not unusual for R & D to design and develop a new piece of equipment which is manufactured at a different location. Under such circumstances, the experts having the best knowledge of the theory of operation of a piece of equipment and the best overall operational knowledge may be in the R & D center 21.

A technical specialist 24 may be located at a remote facility such as a foreign computing center or a center specializing in software preparation and analysis. Depending on the location of the facility, the technical specialist 24 may be linked to processing unit 16 by cable, by wire link, phone modem or by satelite phone link modem.

A feature of the present invention is to easily enable any central processing system 10 of the type to be described hereinafter to be linked to and controlled by persons at factories 19, R & D Centers 21 and facilities 24. Persons located at these places remote from processing unit 16 and central processing unit 10 may perform tests available to them at their locations or to supervise test and software operations using the software library 17 and central service experts 18.

It will be understood that RCTIU 12 is preferably connected to the console 11 and the interface of the I/O units as well as the computer proper of system 10. When connections are made directly to the interface of the console 11 and other components of system 10, the on-site service personnel may operate system 10 using console 11 with the aid of the central processor and/or peripheral equipments located at processing unit 16. Instructions entered into console 11 are formatted and transmitted via RCTIU 12 and transceiver 13 to processing unit 16 where they are converted again. Processing unit 16 processes the instruction and sends out a formatted response on phone line 14. The control signals and data signals on line 14 are formatted again and presented to the component of the system 10 according to the instruction entered into console 11. As will be explained hereinafter the control signals are adapted to format the data signals in a plurality of cells or registers so that they are in proper format to interface directly with the input to the designated component of system 10. The phone line 14 and the requirement for formatting and reformatting causes some delay in the performance of the instruction, however, the delay has not prevented the RCTIU 12 from effectively operating the components of system 10 at computer speeds which had not been possible heretofore.

Figure 2:
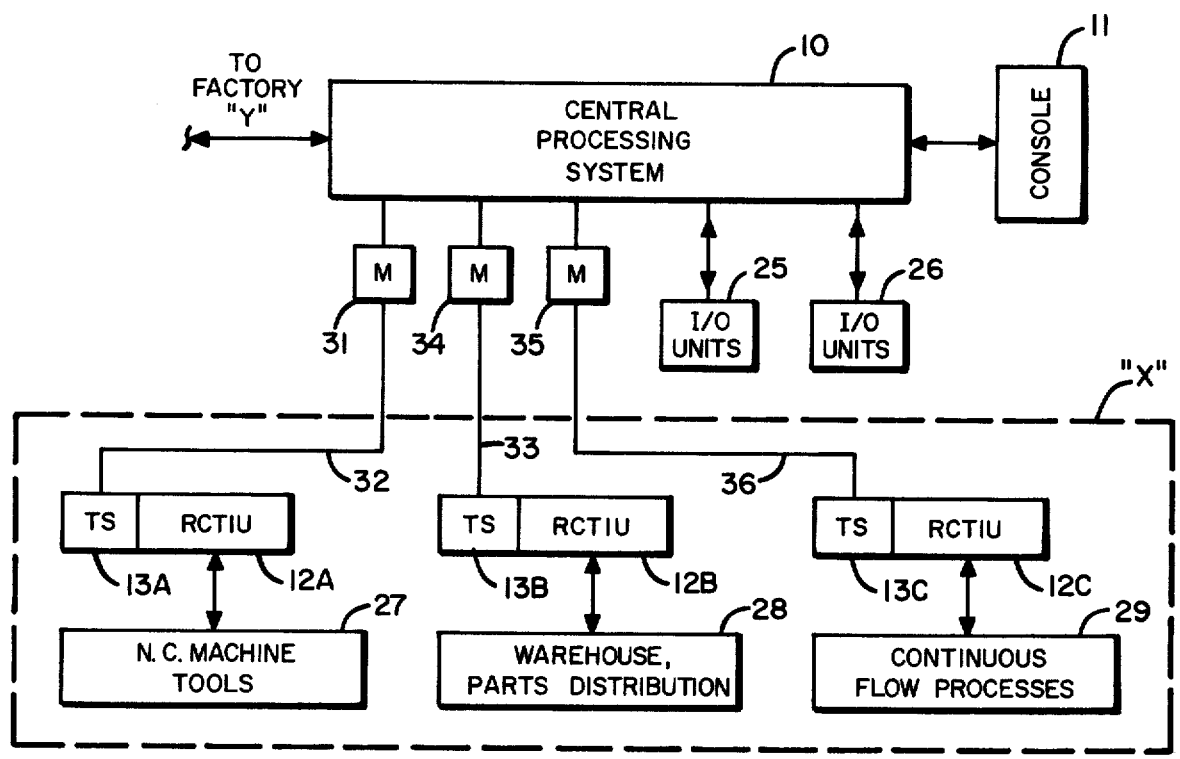
FIG. 2 is a block diagram showing a plurality of automatic factory operations which may be controlled and operated by the central processing system of FIG. 1 through the present test interface unit.
Figure 3:
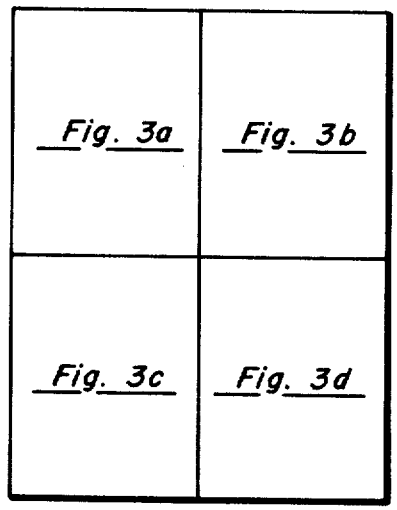
FIGS. 3a to 3d, connected as shown in FIG. 3, comprise a schematic block diagram of the present remote controlled test interface unit connected to a typical central processing system.
Figure 3A:
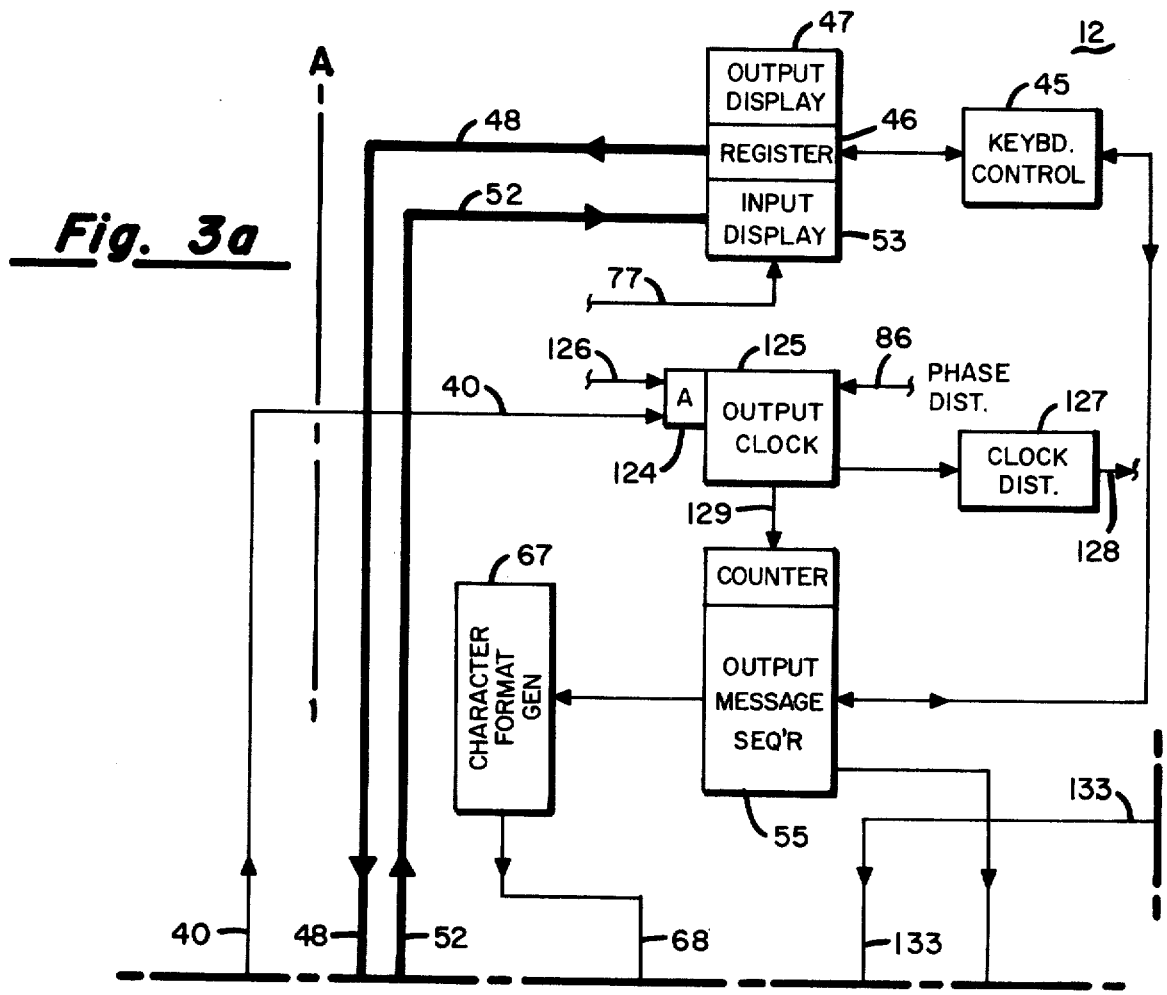
Figure 3B:
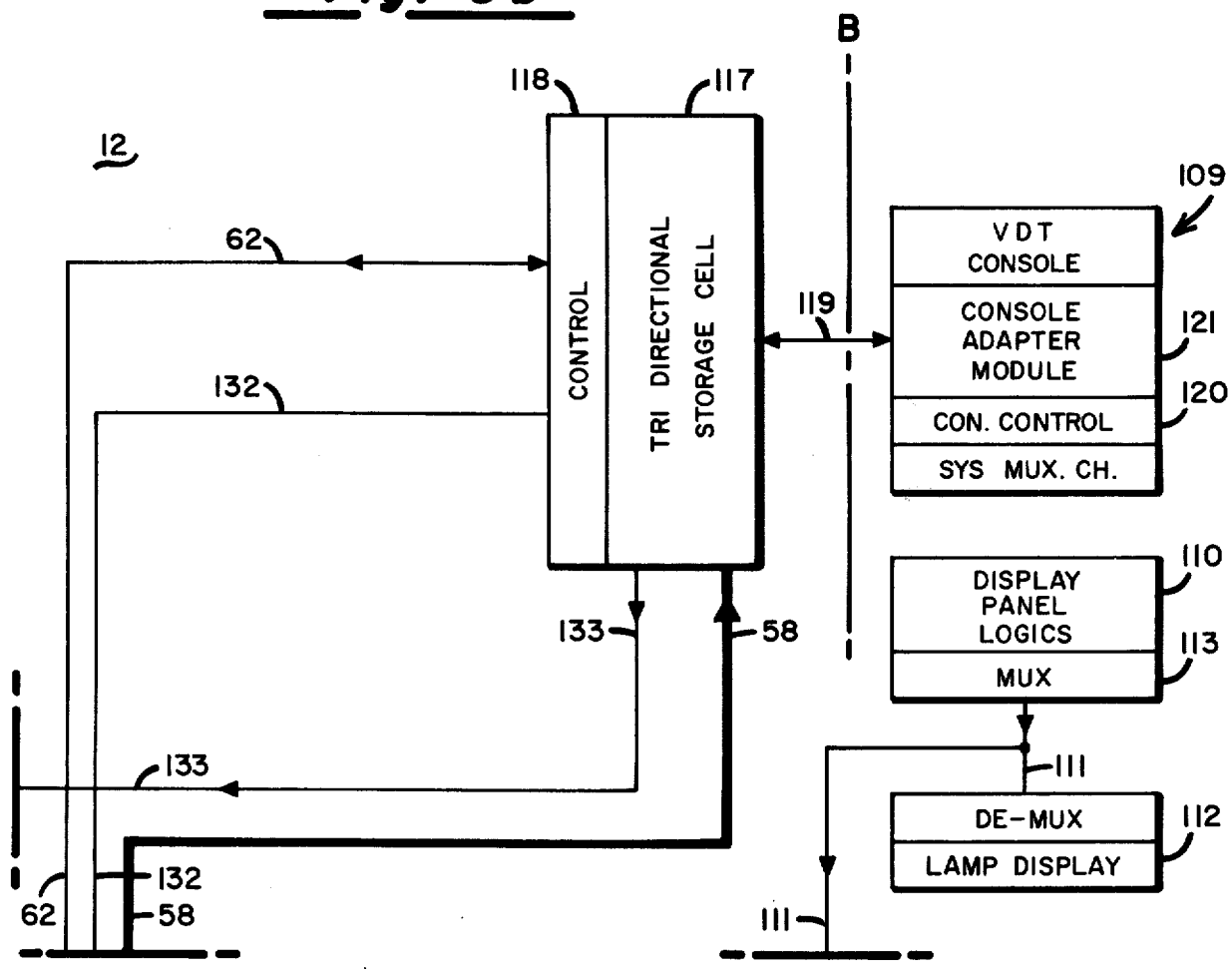
Figure 3C:
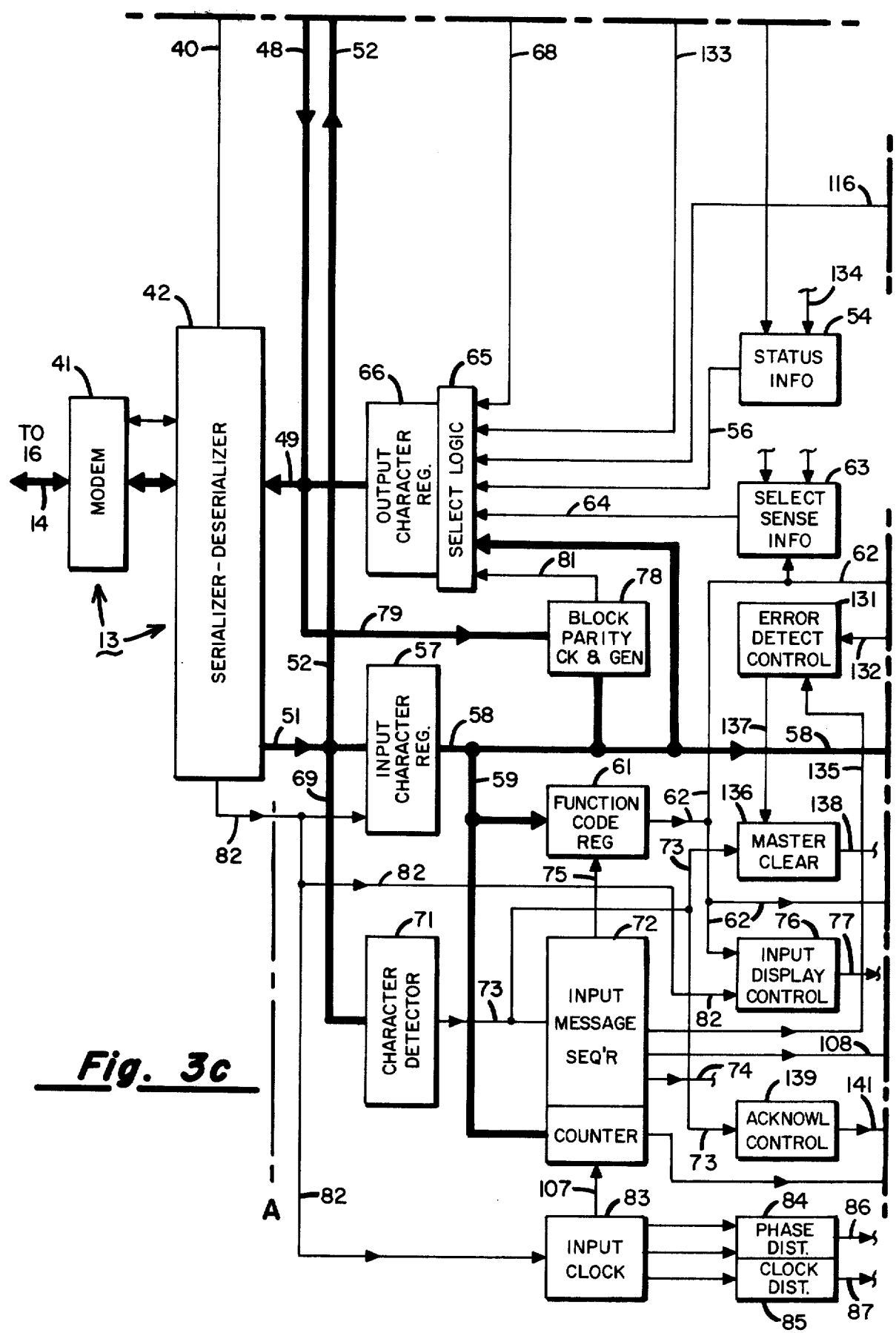
Figure 3D:
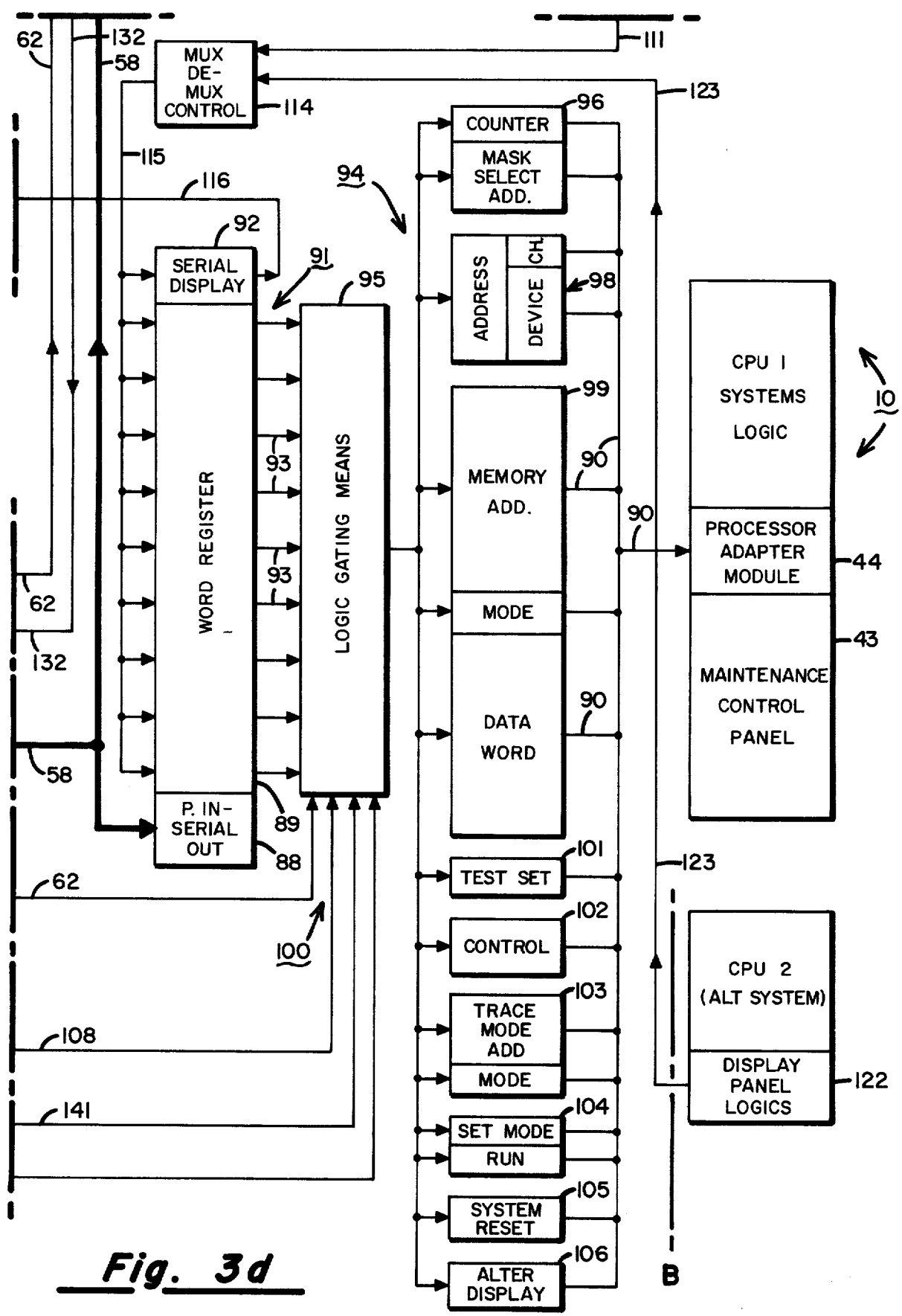

The central processing system 10, shown in FIG. 2, may be the same as, or a system similar to, the system 10 shown in FIG. 1. System 10 and console 11 are shown having input-output (I/O) unit 25 and 26. it has been explained that I/O units 25 and 26 could be operated by a remotely located processing unit 16 employing console 11. Programs may be stored in I/O units 25 and 26 which will control and operate system 10.

In a second preferred mode of operation, shown in FIG. 2, system 10 can be employed in a use configuration which permits system 10 to operate and monitor factory "X" (shown inside phantom lines). A typical manufacturing plant "X" has numerous factilities which are operable by computers. Typical of such facilities are numerical controlled machine tools 27, warehouse inventory parts control and distribution 28, and continuous flow processes 29. In the past such computer controlled facilities 27 to 29 were usually provided with individual dedicated computers or processors for performing unique or batch operation functions. It is known that numerical controlled machines having their own small dedicated computers can be operated by larger computers adapted to run a plurality of numerical controlled machine tools. In the past it was not practical to build a special interface to adapt a large computer to numerical controlled machines. The cost of individual adaptation would probably exceed the cost of the small dedicated computer.

RCTIU's 12A, 12B and 12C, as will be explained hereinafter, have universal interfaces that are changeable by software control. Accordingly, a very large number of different machine tools 27 can be connected to central processing system 10 through modems 31, lines 32 and transceivers 13A without modification. Analysis of the problem reveals that there is no one standard interface connecting the servos of the many different numerical controlled (N.C.) machines in this country, however, it is possible to expand and modify the universal interface, to be explained hereinafter, to be able to control a broad spectrum of such N.C. machines. It is to be understood that RCTIU's 12, 12A, 12B and 12C are presently capable of operating a central processing system 10 and a plurality of peripheral equipments, thus, are inherently capable of operating a plurality of machine tools 27 from a single interface unit 12A.

In similar nammer RCTIU 12B may be substituted for the usual dedicated computer employed to operate warehouse inventory parts control and distribution 28. RCTIU 12B may be connected to central processing system 10 via transceiver 13B, line 33 and modem 34.

In similar manner, RCTIU 12C may be substituted for the usual dedicated computer employed to operate continuous flow processes 29, by using the services of central processing system 10 made available through modern 35, line 36 and transceiver 13C at RCTIU 12C.

Having explained three typical dedicated computer controlled facilities in factory "X", it will be understood that other facilities may be operated in factory "X" by employing RCTIU's like RCTIU 12. Not only does the RCTIU 12 provide the services of a remotely located computer system 10 at a machine or facility in a factory, but the RCTIU 12 provides a universal adaptable interface for converting different computers to different user applications. In some applications of the RCTIU's 12 it may be desirable to modify the interface of the user facility of enable a RCITU to operate a larger number of machines or apparatus faster. This can be done easily and economically by employing newly developed solid state microprocessor large scale integrated circuits (LSI) and LSI memory.

An example of the dual use of an RCTIU 12 for a test interface or a computer-to-equipment interface will aid in the understanding of the novel device. When testing a newly manufactured computer the standard procedure has been to set a plurality of manual switches (rollers) in the maintenance panel and perform operational steps. Changing the manual switches and observing or comparing the results of each operational step requires two to ten man days. By connecting an RCTIU to the maintenance panel interface of the computer under test, all of the switch positions and operational steps may be monitored and stored at a remote location. After the tests are completed and the computer under test is accepted, the stored data may be employed by a remote data processing unit 16 to run the whole series of tests on a second computer under test. It will be understood that the stored data representing the original tests procedure is formatted and reformatted in program form so that it is presented in electronic data form to the computer under test without the need for operation of the manual switches. The electronic testing of a second computer employing data obtained from a first computer can be made in step-by-step operation employing the same RCTIU in ten minutes instead of up to ten days. Not only is the test accomplished faster but high speed tests may pick up errors or malfunction not determinable by manual tests. Since the time required to make such tests is reduced to negligible computer time it has enabled more detailed testing of new computers.

Programs for testing newly manufactured computers may be produced in three ways. When the test results are known it can be pre-programmed. When the step or operation is performed correctly it can be monitored by a RCTIU and the correct result stored. When a computer has been tested and found to be operationally perfect the result of the perfect computer can be compared with the result of the computer under test for the same operational step. In all three modes of testing the RCTIU of the present invention enables the testing to be performed reliably and in a minimum of time without extensive modification or preparation.

Refer now to FIGS. 3a to 3d showing a preferred embodiment installation of a RCTIU 12 which comprises the structure between the phantom lines at points A and B. Transceiver 13 comprises a modem 41 and a serializer-deserializer 42. Transceiver 13 is adapted to receive data signals and control signals from line 14 from remotely located data processing unit 16 in paper form for utilization by RCTIU 12 and to transmit signals on line 14 in proper form for utilization by processing unit 16.

In a preferred mode of operation RCTIU 12 is fitted into a portable suitcase sized container which enables the service engineers to take the complete unit including transceiver 13 to the site of a central processing system 10 and make proper connections therewith. The field engineer plugs the adapter plugs of the RCTIU 12 directly into the components of the system 10 which are to be tested. The RCTIU 12 can be plugged directly into CPU 1 as shown, or plugged into any of the peripheral equipments including I/O units or memory units (not shown). The advantage of having the interface adapters located at or on the maintenance panel 43 is that this enables all of the test facilities of the maintenance panel as well as the facilities of the RCTIU 12 to be located in the same area.

After RCTIU 12 is connected to processing system 10 through processor adapter module 44, keyboard control 45 is employed to make initial contact with the remotely located data processing unit 16. Keyboard control 45 identifies the RCTIU 12, the test to be run and the system 10 under test. Keyboard control has an associated output register 46 and a display 47. Once the correct information is shown on display 47 the operator may activate the transmit button (not shown) on the keyboard control 45 which will activate the output of register 46 on line 48 so that output data is presented on output data line 49. After the processing unit 16 at the remote location receives this information it will be made active to send back a message or data on input data line 51. The incoming data is transmitted via data line 52 to input display 53 and it is presented visually on the display 53. During the generation and transmission of the outgoing data on output data line 49 status information generator 54, which is connected by monitor to keyboard control 45 and connected to output message sequencer 55, generates output signals on output line 56 which informs processing unit 16 of the status of RCTIU 12. Data and signals being received from the remote data processing unit 16 via line 14 and transceiver 13 are presented on line 51 and passed through input character register 57 and presented on lines 58 and 59. The incoming data on line 59 is employed to activate function code register 61. Function code register 61 produces control signals on control lines 62 which cause the select sense information logic 63 to select groups of the output lines from the various parts of the RCTIU 12 for presentation on output line 64 which passes through the select logic 65 and the output character register 66 to output data line 49. A large portion of the information to be sent back to data processing unit 16 that would ordinarily have to be produced at keyboard control 45 can be called for (polled) by the data processing unit 16 may be produced automatically much faster and more accurately by sensing than could be produced by manual insertion into keyboard control 45. It will be understood that the data being generated at keyboard control 45 is presented on line 48 from output display register 46 and is being formatted or frame by information which is being presented from character format generator 67 on line 68 under control of the output message sequencer 55.

In a similar manner, the imcoming data on input data line 51 is presented on line 69 to character detector 71. The character detector 71 is activated by portions of the incoming data information and activates the input message sequencer 72 via line 73. It will be understood that the input message sequencer 72 has a plurality of output control lines 74 which are connected to the different components of the RCTIU 12 which receive the incoming data signals. These control signals on line 74 are employed to control the reception of the incoming data at the receiving components of the RCTIU 12. The output line 75 from input message sequencer 72 to function code register 61 is employed to produce control line gating signals on line 62 which route the incoming data on line 51 to the proper components of the RCTIU 12 at the proper times.

Accordingly, all of the control signals and data signals on line 51 are being presented to input display 53 but are not being displayed. The control signals presented to function code register 61 generate control signals on line 62 which are routed to input display control 76. The output gating signals on line 77 from input display control 76 enable input display 53 to receive only the signals to be displayed at the proper time.

All of the incoming control signals and data signals comprising information on line 51 also appear on line 58 at the input of block parity check and generator logic 78. The logic 78 produces an internal block parity check character from the incoming information and at the end of each block of information coming in on line 51 there is a block parity check character produced by the data processing unit 16. The block parity check characters are compared in the logic 78. The current data and the control signals are only executed if the comparison is affirmed.

All of the outgoing control signals and data signals appearing on line 49 are also re-routed as an input via line 79 to the block parity check and generator logic 78 to produce a block parity check character which is recirculated back on line 81 as part of the output control and data signals on line 49 which serves to provide a block parity check character for data processing unit 16 to use in validating the data transmission. There is always a block parity check character generated in logic 78 for all incoming and outgoing information.

Once the RCTIU 12 and data processing unit 16 have finished with their initial contact with each other and made preliminary identification and verification, the remotely located data processing unit 16 is ready to transmit the test program data. The program is sent in on input data line 14 through transceiver 13 to line 51 and appears at input character register 57. The serializer-deserializer 42 generates an input data available signal on line 82 which informs the input character register 57 that the signals appearing are input data signals. The same input data available signal on line 82 is transmitted to clock 83 which produces a series of phase signals and clock distribution signals at phase distributor 84 and clock distributor 85. Input clock 83 may be synchronized with other timing means from the transceiver 13 or the central processing system 10 or may be provided with its own internal oscillator for producing the proper timing signals on lines 86 and 87 which are used throughout the RCTIU 12.

Assume now that the information coming in on line 51 is a function control message which will cause CPU 1 to operate in some manner. The information and data entering on line 51 is in a 7 bit parallel array and is passed through input character register 57 and appears on line 58. The information on line 58 is loaded directly into a parallel input-serial output loading shift register 88 and is transferred into word register 89 which comprises the serial shift register portion of the buffer storage means 91. Word register 89 comprises a seventy-two bit long word shift register. Buffer storage means 91 also comprises a serial display extension shift register portion 92 which is serial in and parallel out. The seventy two parallel out lines 93 from word register 89 are connected to control register means 94 via logic gating means 95. As will be explained hereinafter the logic gating means 95 are operated by the input control signals at 100 coming from the format control means comprising function code register 61 and input message sequencer 72. The output of word register 89 on lines 93 in only seventy-two output lines wide, however, the output from the control register means 94 one lines 90 is 140 lines wide. In order to load the cells of control register means 94 it is necessary that the word storage register 89 be loaded more than once and that the transfer to the control register means 94 be made more than once. Control register means 94 comprises a plurality of groups of storage cells containing functional control information and data to be used by the components of system 10 under test (in this case CPU 1). The functional control and data information for controlling a CPU may include mask counter 96 comprising a settable decrementing counter having a decode portion for designating mask selection addresses. Cell group 98 may comprise a parallel loadable register of fifteen cell bits whch has multi-purpose use. Cell group 98 may be employed for the initial load address identifying the device and its channel. Cell group 99 comprises two portions consisting of a twenty-four bit cell group and a thirty-two bit cell group together forming a fifty-six bit cell group which is loadable is parallel and employed for multiple purposes. The upper portion of twenty-four bits may be employed for addressing memory and informing the device under test of the mode of operation. The lower thirty-two bit cell portion may be employed for transmitting data words. For example, if the data word is thirty-two or fewer bits long the data word portion may be transferred directly into the CPU under test. If the CPU under test does not require all thirty-two bits, the lower portion of the data word cell is employed to store and transfer the data word. Cell group 101 is a single cell group which may be loaded direct from the function code register 61. This single cell group 101 may be employed for a test set or other single bit control indication. The cell group 102 is a six bit parallel register which is loadable for different instructions such as a process mode control. Cell group 103 is a sixteen parallel loadable cell group which may be used for instructions which require dual functions. The upper portion of the instruction in cell 103 may be employed for indicating a special trace mode address stop and the bottom portion of cell 103 may be employed to indicate its mode. Cell group 104 is a five bit combined with a two bit parallel loadable register cell group which may be employed for dual functions such as a "set mode" and "run". Cell group 105 comprises a single cell group and may also be loaded directly from the function code register 61 for indicating functions such as system reset, etc. Cell group 106 comprises a three bit parallel loadable register which may be used for multiple uses such as to alter or display portions of the memory of CPU 1.

Having explained a preferred embodiment cell group which comprises the control register means 95 it will be understood that the multiple bit parallel loadable registers or cells are usable for multiple purposes and that the parts of the registers that are loaded are under control of the function code register 61 which contains control information that was transmitted in on data line 58 prior to the information which was loaded into word register 89. The information that is loaded into register 89 and subsequently loaded into control register means 94 is timed and sequenced under the control of the phase distributor pulses on line 86 and the clock distributor pulses on line 87. Clock signals on line 107 from input clock 83 are applied to the counter of input message sequencer 72 to produce output control signals on line 108 which are employed to operate the logic gating means 95. The other control signals from input message sequencer 72 are employed in a similar manner which will be explained hereinafter.

The plurality of output lines 90 from control register means 94 are connected to processor adapter module 44 which is connected between the maintenance control panel portion 43 and the systems logic portion of CPU 1. The adapter module 44 may have additional output lines (not shown) which are connected to the peripheral units forming a part of central processing system 10. It will be understood that lines such as lines 90 and adapter modules such as adapter module 44 will be employed to connect directly to the peripheral units (not shown) which are to be serviced or to be checked. The plurality of output lines 90 from control register means 94 are capable of producing any signal function that the CPU 1 system or the peripheral equipment systems are capable of recognizing and responding to. The maintenance control panel 43 of CPU 1 is provided with a few manual control switches which enable a few manual control operations at manual stepped speeds. If CPU 1 has been having a high speed malfunction that occurs in its normal run mode but does not occur when stepped in its maintenance mode employing the maintenance panel operations the error could not be detected by the normal maintenance panel servicing operation. Further, it is not feasible to manually step several thousand operations at the maintenance panel to determine if you are going to find the high speed malfunction. A preferred solution to the high speed malfunction problem is to set up the instruction that has caused the malfunction. Then set the multiple run feature to one thousand or more steps. At the end of each series of one thousand steps the operator can determine if the error has occured. Once the series of instructions causing the error has been isolated a branching operation can be programmed into the test program. When the condition causing the malfunction is isolated the conditions may be displayed at console 109. When the number of conditions being diagnosed exceed the capability of the display terminal 109 the test program may be set to perform each of the subroutines independently so that they may be displayed and the conditions examined until the error occurs simultaneously with the display of the conditions. Having explained how CPU 1 may be operated to detect a high speed malfunction it will be understood that any piece of operable peripheral equipment of central processing system 10 may be diagnosed at computer speeds by actual run conditions. Further, RCTIU 12 may be operated in a monitor or "babysitter" mode to detect a high speed intermittent error which may not occur for several days during normal operations.

It will be appreciated that computers, memories and peripheral equipments are being operated at very high speeds and require a computer speed diagnostic system. Errors which occur in high speed computing systems in the field are sometimes the result of the environment or the program being run and could not be detected during manufacturing tests.

The CPU 1 is not capable of recognizing its own error while performing useful work. Proper diagnosis of a high speed error usually requires that the central processing system 10 under test supply information to data processing unit 16. It is not sufficient for the test program to be transmitted to system 10 to be run by CPU 1 because CPU 1 is not capable of diagnosing its own operational problem. Assuming that a high speed intermittent error has occurred in a program at CPU 1 and the usual check circuits in CPU 1 have not isolated the error it is necessary that the error be diagnosed and recognized by the remote data processing unit 16. Central processing system 10 and CPU 1 are provided with means for supplying this information to the remotely located data processing unit 16 which comprises the regular output lines and a series of monitoring devices which are located at the maintenance control panel and the display panel logics 110.

Hundreds of points in central processing systems 10 are provided with monitor points and/or check points. Preferably, as in the preferred embodiment, all of the points are multiplex and reduced to several parallel lines so that all of the monitored points and check points can be scanned and/or displayed at display panel logic 110. Thus, all the intelligence of central processing system 10 may be presented at line 111 and/or displayed at lamp display 112.

The information containing the error generated in central processing system 10 is available on line 111 from multiplexer output 113. Line 111 represents nine lines of multiplexed data signal paths and four lines of multiplex control information. The data is transmitted through multiplexer-demultiplexer-control 114 onto line 115 where it is set or jammed into serial word register 89. The 9 × 8 multiplex data on line 111 may be sequentially loaded into word register 89 filling all seventy-two bits of the register. The information in word register 89 is serially shifted out into serial display portion 92 and presented as seven bit characters on line 116. Line 116 is connected to the output character register 66 and output data line 49 via select logic 65.

The output data containing the indication of an error is transmitted by transceiver 13 and line 14 to data processing unit 16 where the information containing the error is processed and the error is detected. A signal is sent back via line 14 to input data line 51. The transmitted error signal on input data line 51 may be processed in one or two preferred modes. In a first mode, the information may be passed directly to input display 53 via line 52 where the indication of the occurrence of an error or the error may be displayed.

In a second preferred mode of operation not inconsistent with the first mode of operation, the error signal is presented on line 58 and routed to tridirectional storage cells 117. Function control register 61, connected via line 62 to the control portion 118 of storage cells 117, causes the error signal information to be loaded in parallel into the storage cell portion 117 character by character. The parallel formatted error signal data is applied to console 109 via bidirectional character data line 119. Console 109 preferably comprises a visual display terminal (VDT) connected to the console adapter module 121 and the console control 120 so that the error signal indication may be visually displayed at the screen at the same time the error indication is presented to the central processing system 10. The error signal data on bidirectional line 119 may be employed to generate error status which is capable of stopping the CPU 1 and activating the error indicators therein. The data processing unit 16 at the remote location is also provided with a visual display terminal and the operators who are performing the test at the remote location are provided with sufficient information to enable them to run complete programs, parts of programs or individual steps of a program to isolate the error condition in CPU 1.

As a further example, CPU 2 comprising display logics 122, may be connected to the RCTIU 12 in a manner similar to CPU 1. Assuming that all of the information of the CPU 2 is available on lines 123 comprising seventy-two direct inputs to multiplexer-demultiplexer-control 114 the information containing the error is multiplexed and presented on line 115 to word register 89. After the information is placed in word register 89 the transmission of the information containing the error back to remotely located data processing unit 16 is substantially the same as described herein before. The output data on line 49 is recirculated via line 79 to block parity generator 78 which generates a block parity character. The block parity character is transmitted at the end of the data being presented by line 116 to output data line 49.

When output data is being presented on output line 49 and the end of a transmission of data has occurred there is an empty line and the line is available for the transmission of the next series of information. An empty line signal is generated at transceiver 13 on line 40 which is applied to AND gate 124 at output clock 125 indicating that information can be transmitted from RCTIU 12. A phase distribution signal on line 86 is also applied to clock 125. When a transmit signal occurs on line 126 at AND gate 124 simultaneously with a line empty signal on line 40 the output clock 125 generates output clock signals. One of the output clock signals is applied to clock distributor 127 to provide clock distribution signals on line 128. Another output clock signal on line 129 is applied to output message sequencer 55 which clocks out the characters being presented on line 116 to select logic 65 or causes the character format generator 67 to generate the format generation characters on line 68 which are being presented to select logic 65.

The error detect control 131 monitors the internal operation of the RCTIU 12 and indicates errors and irregularities by generating error signals. These error signals and error conditions are available for transmission as status code information on line 56 to the remote data processing unit 16. The status code information block 54 has a plurality of monitored inputs 134 and an output line 56 which is applied to select logic 65 for generating status information at the remote data processing unit 16. The error detection control 131 also monitors the console 109 interface via console adapter module 121 and line 132 and monitors the input message sequencer 72 over line 135. The master clear circuits 136 generate error clear signals on line 137 and thereby generate all clear signals on line 138 for clearing the RCTIU 12. The acknowledge control circuits 139 generate signals on line 141 for enabling the executing gates of the logic gating means 95.

It will now be understood that persons located at remote locations 19, 21 and 24, as well as persons at location 16, may operate test diagnostic programs being run on a computer data processing unit 16. Further, any of the consoles at the several locations may be placed in a monitor mode and the information being presented on the screen of the console running the program may be observed by those at other locations. Accordingly, consoles at remote locations placed in the monitor mode may be employed for instructional purposes.

The on-site operator at central processing system 10 is not restricted to performing his diagnostic test at the maintenance control panel employing the manual selection switches or rollers hereinbefore described. If there is a high speed error in the on-site computer the on-site operator may make initial diagnostic test at console 109. As explained hereinbefore, all intelligence of the central processing system 10 is available at line 111. When the on-site operator at the console wants to look at what is happening at the monitor and check points he may enter a command to "scan up" the information which would ordinarily be monitored at the manual switches of the maintenance panel 43 and viewed at display panel 110. The command is first transmitted to the data processing unit 16 from the console 109 where the command is processed and a new command or instruction is transmitted to the RCTIU 12. Any of the numerous monitor or check points may be defined as masks of information comprising seventy-two bits of information each in the preferred embodiment. The first mask of information may be identified as a starting mask address at cell 97. The number of masks of information to be transmitted may be set in counter 96. When the preset counter 96 is decremented to zero all of the masks have been transmitted back to data processing unit 16. As each mask of information is transmitted the counter 96 is decremented and the mask selection address cell 97 is incremented. The information at the monitor and check points is presented on line 111 at multiplexer-demultiplexer-control 114 and is transmitted via line 116 to data processing unit 16. The mask information is preferably stored at data processing unit 16 and later transmitted back to central processing system 10 via lines 51, 58 and 119 to console 109 where it is displayed.

Employing this latter mode of operation the on-site operator at central processing system 10 may be able to run a series of steps to an error stop. An error stop is herein defined as the point at which an instruction in system 10 fails. If the error occurs in a specific instruction, the operator may then run the program until the error stop is determined. If the diagnostic program at the data processing unit 16 is sophisticated enough, the on-site operator may run the program to a point just prior to the error stop and then run individual cycles of the determined error instruction. When the diagnostic program is of the detailed type employed in a factory manufacturing operation the component of the system which has caused the error may be identified. Once the component is identified the component to be replaced is usually located in a module which is plug compatible with a new error free unit.

Having explained how all of the information available at a central processing system 10 may be transmitted to a remote location, and how a console located anywhere can be employed to operate a central processing system located elsewhere, it will be appreciated that the RCTIU 12 of the present invention can be employed as an interface for a central processing system 10 or as an interface for a component such as a piece of peripheral equipment, a numerical control machine, a parts inventory system or a continuous flow process.

The RCTIU 12 of the present invention was developed to be small, portable and economical. Having achieved these ends, the preferred embodiment shown has been described as a hard-wired structure to best illustrate the function of the components and controls of the system. These structural components, registers and controls may now be implemented in software and in large part by newly developed microprocessor LSI elements and LSI memory to perform the same operational steps in the same manner hereinbefore described.

We claim:

1. A universal remotely controlled test interface unit for operating central processing units and peripheral devices of a data processing system from a remote location comprising:
   a communications transceiver for receiving from a remote data processing unit information containing control signals and data signals,
   input data control means for receiving and processing said information from said communications transceiver,
   buffer storage means connected to said input data control means for receiving and storing said data signals,
   format control means connected to said input data control means for receiving and processing said control signals,
   control register means for receiving and storing the data contents of said buffer storage means,
   logic gating means connecting said buffer storage means to said control register means for transferring the contents of said buffer storage means to said control register means under the control of said format control means,
   said control register means being partitioned into a plurality of groups of storage cells by said control signals to define a parallel line interface compatible with the processing unit to be operated from said remote location by said data signals, and
   said control register means further comprising groups of control storage cells and groups of data storage cells adapted to test the unit to be operated from a remote data processing unit.

2. A universal remotely controlled test interface unit as set forth in claim 1 wherein one of said storage cells of said control register means comprises a counter adapted to be connected to the display panel logic of said data processing system to be controlled through said parallel line interface,
   a demultiplexer control connected to said buffer storage means and adapted to be connected to said display panel logic of said data processing system,
   said demultiplexer control being connected to said format control means for loading response signals from said device to be controlled into said buffer storage means, and
   output control means connected to said buffer storage and said communications transceiver means for processing said response signals to be transmitted to the remotely located data processing unit.

3. A universal remotely controlled test interface unit as set forth in claim 2 wherein said output control means further includes a keyboard control for initiating control request signals to said remotely located data processing unit, whereby, an operator at said device may operate said device employing a remotely located data processing unit.

4. A universal remotely controlled test interface unit as set forth in claim 1 wherein said device to be operated includes an operable visual display terminal console and an inoperable central processing unit, and
   a multi-directional storage means for sending and receiving control and data signals to and from said remotely located data processing unit, whereby, an operator at said inoperable central processing unit may operate said device by employing said visual display terminal console and said remotely located data processing unit.

5. A universal remotely controlled test interface unit as set forth in claim 2 which further includes input clock means connected to said communications transceiver and to said format control means, and output clock means connected to said communications transceiver and to said output control means for timing control and data signals.

6. A universal remotely controlled test interface unit as set forth in claim 2 which further includes a block parity generator and check means connected to said communications transceiver for generating a block parity character from data signals received and for comparing said block parity character with a parity character received from said remotely located data processing unit.

7. A universal remotely controlled test interface unit as set forth in claim 6 wherein said output control means comprises an output character generator having an input and an output connected to said block parity generator and check means for generating a block parity character from the output of data being transmitted from said output character generator.

8. A universal remotely controlled test interface unit as set forth in claim 2 wherein said communications transceiver further includes a serializer-deserializer, and
 a manual keyboard control interface unit for generating output signals indicative of operator requests and control signals,
 said output signals of said manual keyboard control unit being transmitted through said serializer-deserializer to said remotely located data processing unit.

9. A universal remotely controlled test interface unit as set forth in claim 8 which further includes a visual display comprising an output display for displaying said output signals from said keyboard control and an input display for displaying reply signals received from said remotely located data processing unit.

10. A universal remotely controlled test interface unit as set forth in claim 2 which further includes a multi-directional storage means comprising a group of storage cells connected to said input data control means and to said output control means being adapted to be connected directly to said central processing units and peripheral devices to transmit data thereto and receive data therefrom.

11. A universal remotely controlled test interface unit as set forth in claim 10 which further includes a visual display terminal console connected to said multi-directional storage means, whereby, said central processing units and peripheral devices may be operated directly from said remotely located data processing unit.

12. A universal remotely controlled test interface unit as set forth in claim 11 which further includes error detection means connected to said multi-directional storage means and said format control means for monitoring the incoming control signals from said remotely located data processing unit and the outgoing control signals from said visual display terminal console.

13. A universal remotely controlled test interface unit as set forth in claim 2 which further includes a select sense means connected to said format control means and said buffer storage means for recirculating data signals to said output control means from said input data control means and said buffer storage means.

14. A universal remotely controlled interface unit for operating equipment from a remote location comprising:
 a communications transceiver for receiving from a remote data processing unit information containing control signals and data signals,
 input data control means for receiving and processing said information from said communications transceiver,
 buffer storage means connected to said input data control means for receiving and storing said data signals,
 format control means connected to said input data control means for receiving and processing said control signals,
 control register means for receiving and storing the contents of said buffer storage means,
 logic gating means connecting said buffer storage means to said control register means for transferring the contents of said buffer storage means to said control register means under the control of said format control means,
 said control register means being partitioned into a plurality of groups of storage cells by said control signals to define a parallel line interface compatible with the equipment to be operated from said remote location by said data signals,
 bidirectional storage cell means adapted to receive response signals from said equipment to be operated from said remote location, and
 output data control means for processing and delivering said response signals to said transceiver for transmission to said remote data processing unit.

* * * * *